(12) United States Patent
Bassham et al.

(10) Patent No.: US 9,637,019 B2
(45) Date of Patent: May 2, 2017

(54) SYSTEM AND METHOD FOR CHARGING A PLUG-IN ELECTRIC VEHICLE

(75) Inventors: Marjorie A. Bassham, Burton, MI (US); Ciro A. Spigno, Jr., Waterford, MI (US); Brett T. Muller, Milford, MI (US); Vernon L. Newhouse, Farmington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 433 days.

(21) Appl. No.: 13/346,109

(22) Filed: Jan. 9, 2012

(65) Prior Publication Data

US 2013/0175974 A1 Jul. 11, 2013

(51) Int. Cl.
*H02J 7/00* (2006.01)
*B60L 11/18* (2006.01)

(52) U.S. Cl.
CPC ....... *B60L 11/1837* (2013.01); *B60L 11/1861* (2013.01); *B60L 2240/62* (2013.01); *B60L 2240/64* (2013.01); *B60L 2240/70* (2013.01); *Y02T 10/7005* (2013.01); *Y02T 10/705* (2013.01); *Y02T 10/7044* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/162* (2013.01)

(58) Field of Classification Search
CPC .............................. Y02T 90/10; Y02T 90/14
USPC .................................... 320/104, 109; 701/22
See application file for complete search history.

(56) References Cited

U.S. PATENT DOCUMENTS

| 7,698,078 B2* | 4/2010 | Kelty et al. ..................... 702/63 |
| 7,778,746 B2* | 8/2010 | McLeod et al. ................ 701/22 |
| 7,986,126 B1* | 7/2011 | Bucci ......................... B60L 3/12 320/109 |
| 2001/0046884 A1* | 11/2001 | Yoshioka ............... G01C 21/26 455/564 |
| 2009/0210357 A1* | 8/2009 | Pudar .................. B60L 11/1816 705/412 |

OTHER PUBLICATIONS

Mio Technology, How does GPS work?, Aug 17, 2010 (provided by wayback machine https://archive.org/web/), p. 1.*

(Continued)

*Primary Examiner* — Drew A Dunn
*Assistant Examiner* — Zixuan Zhou
(74) *Attorney, Agent, or Firm* — Reising Ethington, P.C.; Lionel Anderson

(57) ABSTRACT

A charging system and method that may be used to automatically apply customized charging settings to a plug-in electric vehicle, where application of the settings is based on the vehicle's location. According to an exemplary embodiment, a user may establish and save a separate charging profile with certain customized charging settings for each geographic location where they plan to charge their plug-in electric vehicle. Whenever the plug-in electric vehicle enters a new geographic area, the charging method may automatically apply the charging profile that corresponds to that area. Thus, the user does not have to manually change or manipulate the charging settings every time they charge the plug-in electric vehicle in a new location.

14 Claims, 3 Drawing Sheets

(56) References Cited

OTHER PUBLICATIONS

Mio Technology, How does GPS work?, Aug. 17, 2010 (provided by wayback machine https://archive.org/web/), p. 1.*
Society of Automotive Engineers (SAE), "SAE Electric Vehicle Conductive Charge Coupler", Oct. 1996, Publication No. J1772 (37 pages).
Society of Automotive Engineers (SAE), "(R) SAE Electric Vehicle Inductively Coupled Charging", (R) Nov. 1999, Publication No. J1773 (35 pages).
Chinese Office action dated Jul. 2, 2014, 8 pages.

* cited by examiner

SYSTEM AND METHOD FOR CHARGING A PLUG-IN ELECTRIC VEHICLE

This invention was made with U.S. Government support under Agreement No. DE-FC26-08NT04386, A000 awarded by the Department of Energy. The U.S. Government may have certain rights in this invention.

TECHNICAL FIELD

The present invention generally relates to plug-in electric vehicles and, more particularly, to systems and methods for charging plug-in electric vehicles that allow for customized charging settings.

BACKGROUND

Some plug-in electric vehicles allow for user-defined parameters that control certain aspects of a battery charging process, where the user establishes the parameters through a manual data entry process. The process for manually entering and establishing such parameters, however, can be tedious and oftentimes discourages users from taking full advantage of this feature. This is particularly true if the user is frequently asked to provide such parameters; for example, if they are asked to provide a different set of parameters each time the plug-in electric vehicle is charged at a new location.

SUMMARY

According to one embodiment, there is provided a method for charging a plug-in electric vehicle. The method may comprise the steps of: (a) storing one or more charging profile(s); (b) obtaining a current location for the plug-in electric vehicle; (c) determining if the current location for the plug-in electric vehicle corresponds to a certain profile area; and (d) if the current location for the plug-in electric vehicle corresponds to a stored profile area, then using the associated charging profile to charge the plug-in electric vehicle.

According to another embodiment, there is provided a method for charging a plug-in electric vehicle. The method may comprise the steps of: (a) maintaining a plurality of charging profiles, each charging profile includes a set of user-defined charging settings and is associated with a certain profile area; (b) obtaining a current location for the plug-in electric vehicle; (c) comparing the current location for the plug-in electric vehicle to the plurality of stored profile areas; and (d) establishing a set of user-defined charging settings for charging the plug-in electric vehicle based on the comparison between the current location of the plug-in electric vehicle and the stored profile areas.

According to another embodiment, there is provided a system for charging a plug-in electric vehicle. The system comprises: a power connection for connecting to an external power source; a battery charger coupled to the power connection; a battery coupled to the battery charger; a global positioning system (GPS) unit for determining the current position of the plug-in electric vehicle; and a control module electronically coupled to the GPS unit for receiving vehicle location signals and electronically coupled to the battery charger for providing charging command signals. The control module is configured so that it uses the vehicle location signals to automatically establish the charging command signals with one or more user-defined charging setting(s).

DRAWINGS

Preferred exemplary embodiments will hereinafter be described in conjunction with the appended drawings, wherein like designations denote like elements, and wherein.

DESCRIPTION

The charging system and method described herein may be used to automatically apply customized charging settings to a plug-in electric vehicle, where application of the settings is based on the vehicle's location. According to an exemplary embodiment, a user may establish and save a separate charging profile with certain customized charging settings for each geographic location where they plan to charge their plug-in electric vehicle; for instance, a first charging profile for charging at home, a second charging profile for charging at work, etc. Some examples of potential charging settings that may be customized include: charging modes (e.g. fast charge, slow charge), charging levels (e.g., limits or thresholds on amperage, voltage, state-of-charge (SOC)), charging times (e.g., start time, end time, departure time), and charging preferences (e.g., preferences for certain electricity rates), to name a few. If the plug-in electric vehicle enters a geographic location that corresponds to a saved charging profile, the charging method can automatically apply the charging settings associated with that particular charging profile. Thus, the user does not have to manually change or manipulate the charging settings every time they charge the plug-in electric vehicle in a new location.

Figure 1:
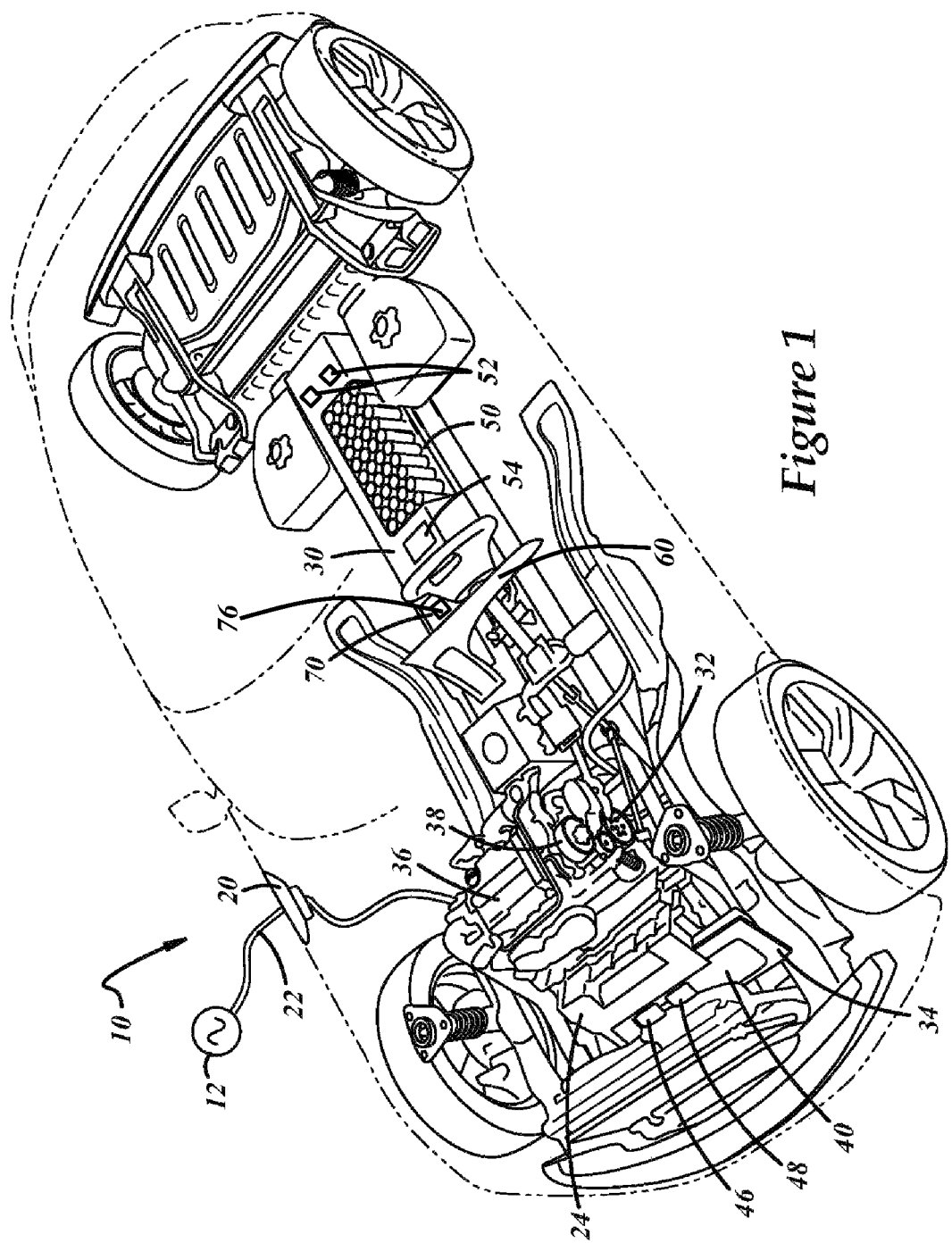
FIG. 1 is a schematic view of an exemplary embodiment of a plug-in electric vehicle that may utilize the charging system and method disclosed herein.

With reference to FIG. 1, there are shown some of the components of an exemplary plug-in electric vehicle 10 that may be used with the charging method described herein. Although the following description is provided in the context of a particular plug-in electric vehicle, it should be appreciated that this vehicle is merely exemplary and that other vehicles may certainly be used instead. For example, the charging system and method described below can be used with any type of vehicle having a high-voltage battery pack that is used for vehicle propulsion, including a plug-in hybrid electric vehicle (PHEV) or a battery electrical vehicle (BEV), to cite a few possibilities. According to an exemplary embodiment, plug-in electric vehicle 10 interacts with an external power source 12 and includes a power connection 20, a battery charger 24, a battery 30, an electric motor 32, an inverter/converter 34, an engine 36, a generator 38, a control module 40, a user interface 60, and a communications module 70.

External power source 12 provides plug-in electric vehicle 10 with electrical power over power coupler 22, and may be one of a number of different power supply types known in the art. For example, external power source 12 can be a public utility that provides electrical power via standard power outlets (e.g., 110 VAC or 220 VAC outlets), or it can be a portable generator such as the type that runs on natural gas, propane, gasoline, diesel, or the like. In one embodiment, external power source 12 is a renewable power source, such as a remote charging station powered by energy from solar panels, wind turbines, hydroelectric means, biomass, etc. External power source 12 is not limited to any particular type or embodiment, so long as it can provide electrical power to plug-in electric vehicle 10 over power coupler 22.

Power connection 20 is an electrical inlet on the plug-in electric vehicle into which power coupler 22 can be plugged or inserted. This enables a vehicle owner to easily connect and disconnect plug-in electric vehicle 10 to and from a common AC wall outlet, for example, such as those commonly found in most garages and charging stations. Power connection 20 is not limited to any particular design, and may be any type of inlet, connection, socket, plug, port, receptacle, etc., including those that are based on conductive, inductive, or other types of electrical connections. Some of these connection types are covered by one or more international standards (e.g., IEC 62196 type 1-2 and mode 1-4, IEC 60309, SAE J1772, etc.). In an exemplary embodiment, power connection 20 is an electrical inlet located on the exterior of plug-in electric vehicle 10 so that it can be easily accessed (e.g., under a hinged door or flap), and includes one or more connections to battery charger 24 for conveying electrical power and one or more connections to control module 40 for communication. Other arrangements and connections are certainly possible.

Power coupler 22 can be used to connect external power source 12 to plug-in electric vehicle 10. Power couplers are sometimes referred to as electric vehicle supply equipment (EVSE) cordsets. Power coupler 22, in one embodiment, may be a specialized cordset specifically designed for use with plug-in electric vehicles (such as those described in specifications SAE J1772 and J1773), which includes a first end, a cable or cord, a control unit, and a second end. The first end of power coupler 22 is a three-prong connection that plugs into a standard AC wall outlet and its second end is a specifically designed connection that plugs into power connection 20 on the vehicle. The cable conducts or transmits electrical power from external power source 12 to plug-in electric vehicle 10, but may also convey one or more communication signals between a control unit of power coupler 22 and devices located on the vehicle, like control module 40. The control unit of power coupler 22 may include any number of electronic components including, but certainly not limited to, sensors, transceivers, processing devices, memory devices, contactors, switches, ground fault circuit interrupter (GFCI) components, as well as any other suitable component. In an exemplary embodiment, the control unit of power coupler 22 is powered by an external power source, monitors various conditions surrounding the power coupler (e.g., the presence of electrical power, the voltage and/or current of the electrical power, the temperature of the power coupler, etc.), and communicates with control module 40 regarding such conditions. Skilled artisans will appreciate that the method described herein is not limited to any particular power coupler or cordset, as any number of different power couplers could be used.

Battery charger 24 may receive electrical power from a variety of sources, including external and/or internal power sources. In the case of an external power source, battery charger 24 may receive electrical power through power coupler 22 which connects external power source 12 to battery charger 24, as already explained. In the case of an internal power source, battery charger 24 may receive electrical power from regenerative braking, a motor-driven generator 38, or some other internal source via connections within the vehicle. Skilled artisans will appreciate that battery charger 24 may be provided according to any number of different embodiments, may be connected in any number of different configurations, and may include any number of different components, such as transformers, rectifiers, switching power supplies, filtering means, cooling means, sensors, control units and/or any other suitable components known in the art.

Battery 30 provides the plug-in electric vehicle with electrical power and, depending on the particular embodiment, may be the primary electrical power source for the vehicle or may be used in conjunction with another power source for power supplementation purposes, to cite two examples. Many different battery types and arrangements may be used, including the exemplary one schematically shown here which includes a battery pack 50, one or more battery sensors 52, and a battery control unit 54. Battery pack 50 is a high-voltage battery pack and may include a collection of identical or individual battery cells connected in series, parallel, or a combination of both in order to deliver a desired voltage, amperage, capacity, power density and/or other performance characteristics. Generally, it is desirable to provide high power and energy densities, which has led to the development and use of many types of batteries including chemical, non-chemical, and others. Some examples of suitable battery types include those that are based on the following technologies: lithium ion, nickel metal hydride (NiMH), nickel cadmium (NiCd), sodium nickel chloride (NaNiCl), or some other battery technology. The battery pack 50 may provide approximately 40-600V, depending on its particular design and application. For example, a heavy truck using a two-mode hybrid system may require a high voltage battery pack capable of providing about 350V, where a lighter vehicle may only need about 200V. In another embodiment, battery 30 may be part of a belt-alternator-starter (BAS) or BAS-plus type system and thus only require a battery pack that provides about 40-110V. In any case, battery pack 50 should be designed to withstand repeated charge and discharge cycles and to receive electrical energy from external power source 12. Skilled artisans will appreciate that the system and method shown and described herein are not limited to any one particular type of battery or battery arrangement, as a number of different battery types could be employed.

Battery sensors 52 may include any combination of hardware and/or software components capable of monitoring battery conditions such as battery temperature, battery voltage, battery current, battery state of charge (SOC), battery state of health (SOH), etc. These sensors may be integrated within unit 30 (e.g., an intelligent or smart battery), they may be external sensors located outside of the battery unit, or they may be provided according to some other known arrangement. Battery sensors 52 may monitor and determine battery conditions on a cell-by-cell basis, on an average or collective basis across a block or region of cells, on an entire battery pack basis, on a representative basis where certain cells are selected to represent the entire battery pack, or according to some other basis or technique known in the art. Output from battery sensors 52 may be provided to battery control unit 54, battery charger 24, control module 40, or some other appropriate device.

Battery control unit 54 may include any variety of electronic processing devices, memory devices, input/output (I/O) devices, and other known components, and may perform various control and/or communication related functions. For example, battery control unit 54 may receive sensor signals from the various battery sensors 52, package the sensor signals into an appropriate sensor message, and send the sensor message to control module 40 over a communication bus or the like. It is possible for battery control unit 54 to gather battery sensor readings and store them in local memory so that a comprehensive sensor message can be provided to control module 40 at a later time, or the sensor readings can be forwarded to module 40 or some other destination as soon as they arrive at battery control unit 54, to cite a few possibilities. Instead of sending the battery sensor readings to control module 40 for subsequent processing, it is possible for battery control unit 54 to process or analyze the sensor readings itself. In another capacity, battery control unit 54 can store pertinent battery characteristics and background information pertaining to the battery's cell chemistry, cell capacity, upper and lower battery voltage limits, battery current limits, battery temperature limits, temperature profiles, battery impedance, number or history of charge/discharge events, etc.

Electric motor 32 may use electrical energy stored in battery 30 to drive one or more vehicle wheels, which in turn propels the vehicle. While FIG. 1 schematically depicts electric motor 32 as a single discrete device, the electric motor may be combined with a generator (a so-called "mogen") or it may include multiple electric motors (e.g., separate motors for the front and rear wheels, separate motors for each wheel, separate motors for different functions, etc.), to cite a few possibilities. Plug-in electric vehicle 10 is not limited to any one particular type of electric motor, as many different motor types, sizes, technologies, etc. may be used. In one example, electric motor 32 includes an AC motor (e.g., a three-phase AC induction motor, a multi-phase AC induction motor, etc.), as well as a generator that can be used during regenerative braking. Electric motor 32 may be provided according to any number of different embodiments (e.g., AC or DC motors, brushed or brushless motors, permanent magnet motors, etc.), it may be connected in any number of different configurations, and it may include any number of different components, like cooling features, sensors, control units and/or any other suitable components known in the art.

Inverter/converter 34 may act as an intermediary between battery 30 and electric motor 32, as these two devices are often times designed to function according to different operational parameters. For example, during vehicle propulsion inverter/converter 34 may step-up the voltage from battery 30 and convert the current from DC to AC in order to drive electric motor 32, while during regenerative braking the inverter/converter may step-down the voltage generated by a braking event and convert the current from AC to DC so that it can be properly stored by the battery. In a sense, inverter/converter 34 manages how these different operational parameters (i.e., AC versus DC, various voltage levels, etc.) work together. Inverter/converter 34 may include an inverter for DC to AC conversion, a rectifier for AC to DC conversion, a step-up converter or transformer for increasing the voltage, a step-down converter or transformer for decreasing the voltage, other suitable energy management components, or some combination thereof. In the exemplary embodiment shown, inverter and converter units are integrated into a single bi-directional device; however, other embodiments are certainly possible. It should be realized that inverter/converter 34 may be provided according to any number of different embodiments (e.g., with separate inverter and converter units, bi-directional or uni-directional, etc.), may be connected in any number of different configurations, and may include any number of different components, like cooling systems, sensors, control units and/or any other suitable components known in the art.

Engine 36 may drive generator 38 using conventional internal combustion techniques, and may include any suitable type of engine known in the art. Some examples of suitable engines include gasoline, diesel, ethanol, flex-fuel, naturally aspirated, turbo-charged, super-charged, rotary, Otto-cycle, Atkins-cycle and Miller-cycle engines, as well as any other suitable engine type known in the art. According to the specific embodiment shown here, engine 36 is a small fuel-efficient engine (e.g., a small displacement, turbo-charged four-cylinder engine) that uses its mechanical output to turn generator 38. Skilled artisans will appreciate that engine 36 may be provided according to any number of different embodiments, may be connected in any number of different configurations (e.g., engine 36 could be part of a parallel hybrid system where the engine is also mechanically coupled to the vehicle wheels instead of exclusively being used to generate electricity), and may include any number of different components, like sensors, control units and/or any other suitable components known in the art.

Generator 38 is mechanically coupled to engine 36 so that the mechanical output of the engine causes the generator to create electrical power that may be provided to battery 30, electric motor 32, or both. It is worth noting that generator 38 may be provided according to any number of different embodiments (e.g., the generator of motor 32 and generator 38 may be combined into a single unit), may be connected in any number of different configurations, and may include any number of different components, like sensors, control units and/or any other suitable components known in the art. Generator 38 is not limited to any specific generator type or embodiment.

Control module 40 may be used to control, govern or otherwise manage certain operations or functions of plug-in electric vehicle 10 and, according to one exemplary embodiment, includes a processing device 46 and a memory device 48. Processing device 46 may include any type of suitable electronic processor (e.g., a microprocessor, a microcontroller, an application specific integrated circuit (ASIC), etc.) that executes instructions for software, firmware, programs, algorithms, scripts, etc. This processor is not limited to any one type of component or device. Memory device 48 may include any type of suitable electronic memory means and may store a variety of data and information. This includes, for example: sensed battery conditions; look-up tables and other data structures; software, firmware, programs, algorithms, scripts, and other electronic instructions; component characteristics and background information, etc. The present method—as well as any other electronic instructions and/or information needed for such tasks—may also be stored or otherwise maintained in memory device 48. Control module 40 may be electronically connected to other vehicle devices and modules via I/O devices and suitable connections, like a communications bus, so that they can interact as required. These are, of course, only some of the possible arrangements, functions and capabilities of control module 40, as others are certainly possible. Depending on the particular embodiment, control module 40 may be a stand-alone electronic module (e.g., a vehicle integration control module (VICM), a traction power inverter module (TPIM), a battery power inverter module (BPIM), etc.), it may be incorporated or included within another electronic module in the vehicle (e.g., a power train control module, an engine control module, a hybrid control module, etc.), or it may be part of a larger network or system (e.g., a battery management system (BMS), a vehicle energy management system, etc.), to name a few possibilities.

User interface 60 may include any combination of hardware, software and/or other components that enable a vehicle user to exchange information or data with the vehicle. This includes, for example, input components like a touch-screen display, a microphone, a keyboard, a pushbutton or other control where user interface 60 receives information from a vehicle user, as well as output components like a visual display, an instrument panel, or an audio system where user interface 60 provides information to the vehicle user. In some cases, user interface 60 includes components with both input and output capabilities, such as visual and audible interfaces. The audible interface may be part of an automated voice processing system that uses voice-recognition and/or other human-machine interface (HMI) technology. User interface 60 may be a stand-alone module; it may be part of an infotainment system or part of some other module, device or system in the vehicle; it may be mounted on a dashboard (e.g., with a driver information center (DIC)); it may be projected onto a windshield (e.g., with a heads-up display); it may be integrated within an existing audio system; or it may simply include an electronic connection or port for connecting with a laptop or other computing device, to cite a few examples.

As explained below in more detail, user interface 60 may be used by the present method to exchange information between a vehicle user and the plug-in electric vehicle in a way that facilitates the charging process. For instance, user interface 60 may receive one or more customized charging settings like utility rate preferences, vehicle conditions, and/or other input from a vehicle user; input that may be used by the present method to charge the plug-in electric vehicle. In addition, user interface 60 may be used by the present method to provide charging status, reports and/or other output to a vehicle user. Other user interfaces may be used instead, as the exemplary user interfaces shown and described herein represent only some of the possibilities. The present method may utilize any user interface to exchange information between a vehicle user and the plug-in electric vehicle and is not limited to any particular type.

Communications module 70 may include any combination of hardware, software and/or other components that enable wireless voice and/or data communication between the vehicle and some other entity. According to one exemplary embodiment, communications module 70 includes a voice interface, a data interface and a GPS receiver 76, and may be bundled or integrated within a device such as a telematics unit. The voice interface enables voice communication to and/or from the plug-in electric vehicle and may include a cellular chipset (e.g., CDMA or GSM chipset), a vocoder, voice over IP (VOIP) equipment, and/or any other suitable device. The data interface, on the other hand, enables data communication to and/or from the plug-in electric vehicle and may include a modem (e.g., a modem using EVDO, CDMA, GPRS or EDGE technologies), a wireless networking component (e.g., one using an IEEE 802.11 protocol, WiMAX, BlueTooth, etc.), or any other suitable device. Depending on the particular embodiment, communications module 70 may communicate over a wireless carrier system (e.g., a cellular network), a wireless network (e.g., a wireless LAN, WAN, etc.), or some other wireless medium. GPS receiver 76 may receive signals from a constellation of GPS satellites and use these signals to determine vehicle position, as is well understood in the art.

The present method may use communications module 70 to exchange information between plug-in electric vehicle 10 and a vehicle user (e.g., via a call center, a website, a mobile communications device, etc.), a public utility and/or some other entity in a way that facilitates the charging process. For example, communications module 70 may be used to receive electricity rates from a local public utility, to receive electricity rate preferences from a user, etc. This includes remote vehicle users who enter customized charging settings via a website or mobile device and then send it to the plug-in electric vehicle. In one embodiment, communications module 70 acts as an alternative to user interface 60 for exchanging information between a vehicle user and the plug-in electric vehicle. In another embodiment, communications module 70 and user interface 60 are both used to exchange such information. Other embodiments and arrangements are also possible. The method described below is not limited to any particular communications module or technology, and it may be used with devices other than the exemplary communications module shown and described here.

Again, the preceding description of exemplary plug-in electric vehicle 10 and the drawing in FIG. 1 are only intended to illustrate one potential vehicle arrangement and to do so in a general way. Any number of other vehicle arrangements and architectures, including those that differ significantly from the one shown in FIG. 1, may be used instead.

Figure 2:
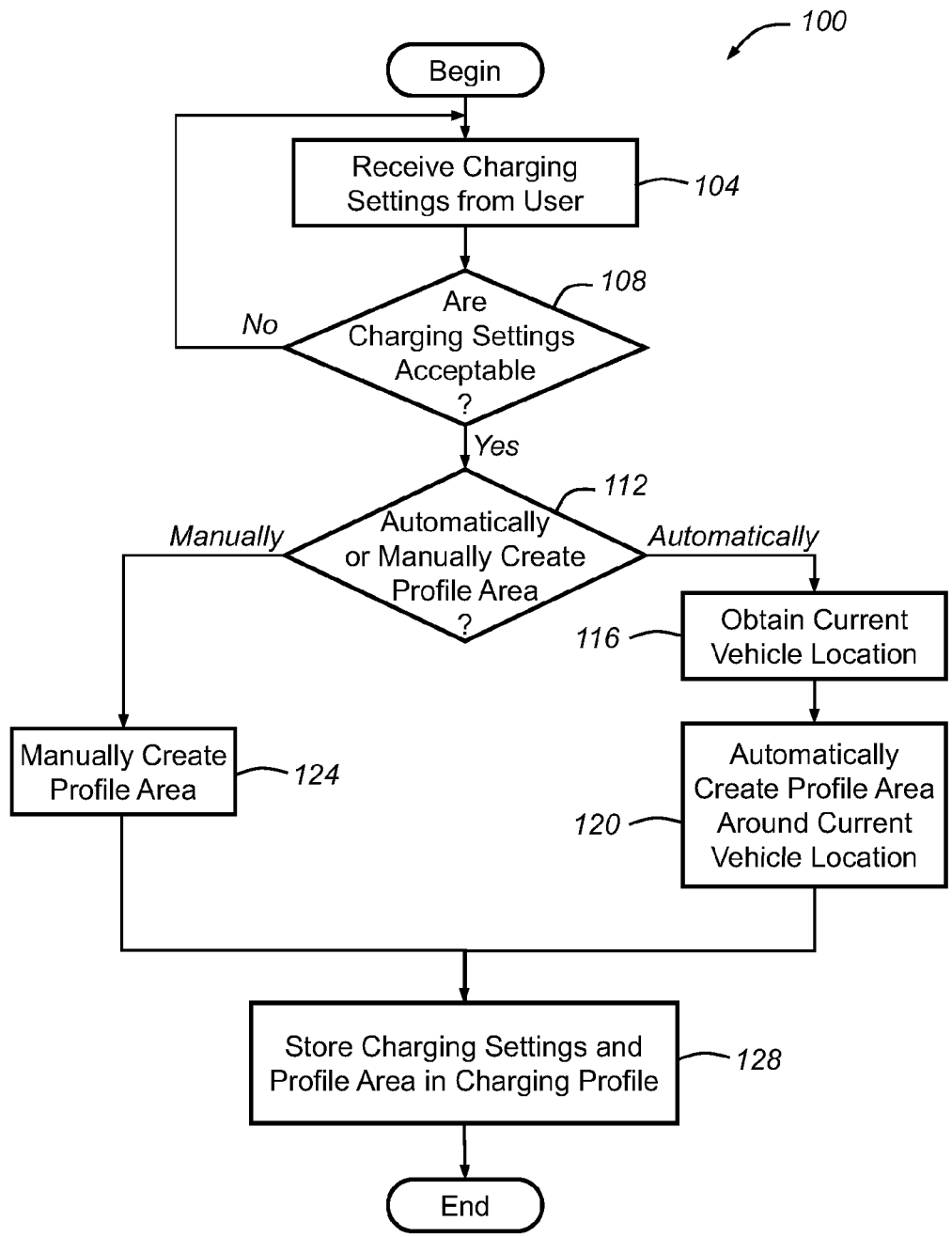
FIG. 2 is a flowchart of an exemplary method that may be used to establish a set of customized charging settings for a plug-in electric vehicle, such as that shown in FIG. 1.
Figure 3:
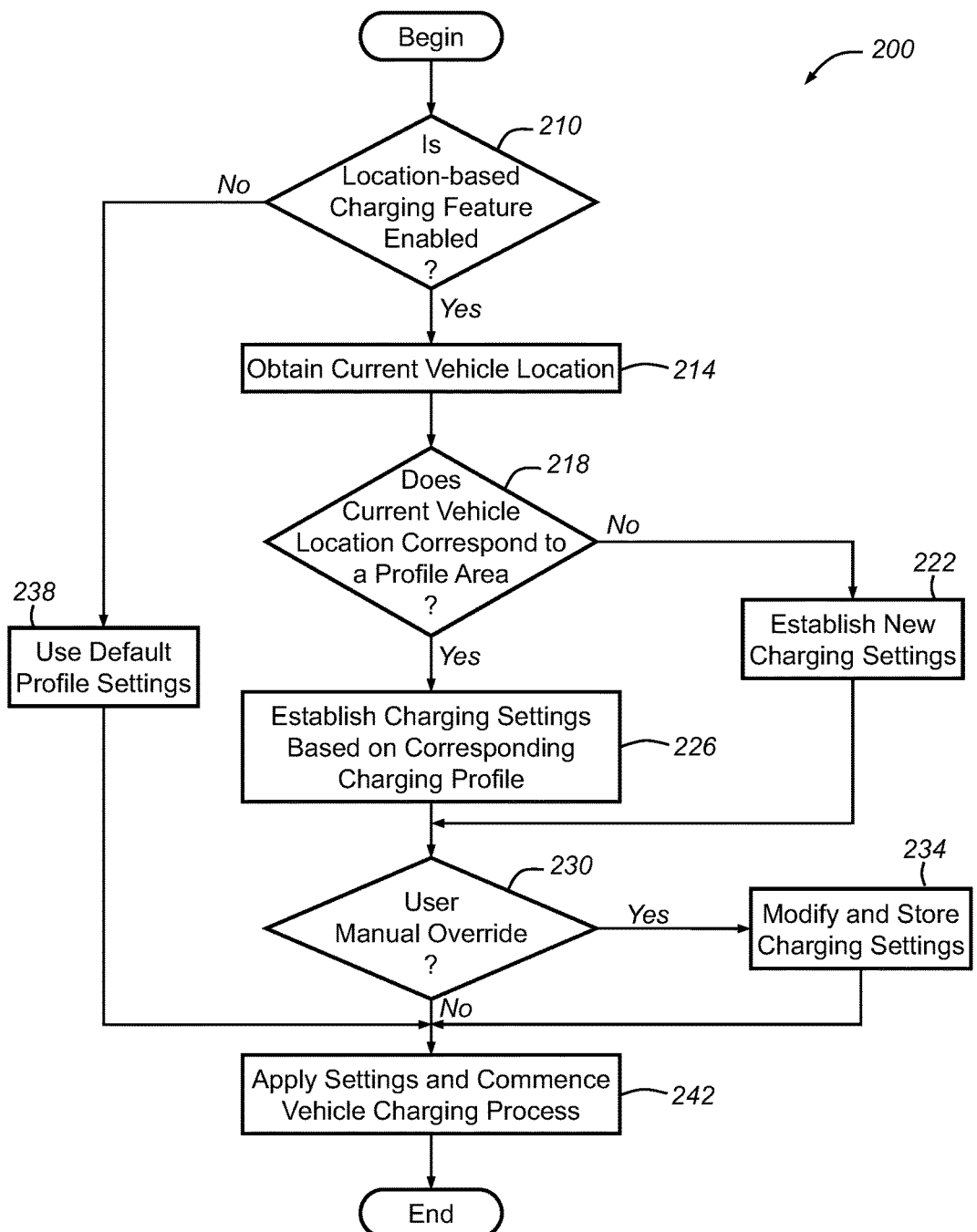
FIG. 3 is a flowchart depicting an exemplary method for applying and using a set of customized charging settings, such as those established by the method of FIG. 2.

Generally speaking, FIG. 2 shows an exemplary method for creating one or more charging profiles with customized charging settings, and FIG. 3 shows an exemplary method for applying a charging profile to a battery charging process based on the current location of the plug-in electric vehicle. The method in FIG. 3 is able to automatically apply or implement a location-based charging profile without requiring the user to reconfigure or otherwise enter new charging settings.

Beginning with FIG. 2, there is shown a method 100 that may be used to create or establish one or more location-based charging profiles that include customized charging settings and are associated with certain geographic areas, referred to here as "profile areas." Whenever plug-in electric vehicle 10 enters a new profile area, the corresponding charging profile may be used to automatically establish the programmable settings or parameters that govern the charging process. A "charging profile," as used herein, includes a collection of settings or parameters, at least some of which are user-defined, that govern certain aspects of a charging process for a plug-in electric vehicle, and the charging profile is associated with a certain geographic area. A charging profile may be created in a number of different forms, including as an electronic file, a database or other data structure that has customized charging settings associated with a profile area and is stored in some memory device located on plug-in electric vehicle 10, such as in battery charger 24, battery 30 and/or control module 40.

Consider the example where a user has a home-based charging profile that includes customized charging settings for charging the plug-in electric vehicle at their home, and a work-based charging profile with customized charging settings for charging the vehicle at their work. The electricity rates at the user's home and work may differ, amperage or other limitations on the external power source at the user's home and work may not be the same, and the amount of available charging time at the user's home and work may vary, to cite a few examples that can warrant two different charging profiles with different preferred charging settings. Method 100 may be initiated or commenced in a number of different ways, some of which are user-initiated and some of which are vehicle-initiated. In a non-limiting example, method 100 is initiated by a user who indicates—either through user interface 60, communications module 70 and/or some other means—that they wish to create a charging profile.

In step 104, the method receives one or more charging setting(s) from a user. The charging settings may be received locally (e.g., the user may enter the charging settings using visual and/or audible features of user interface 60) or they may be received remotely (e.g., the user may provide the charging settings by using an affiliated website, a call center and/or a mobile application connected to communications module 70). As mentioned above, the charging settings may include any combination of different settings, parameters and/or preferences that govern different aspects of the charging process. Some examples of different charging settings that may be selected by the user include: charging modes (e.g., fast charge mode, slow charge mode, delayed charge mode), charging levels (e.g., limits or thresholds on amperage, voltage, state-of-charge (SOC) levels), charging times (e.g., start time, end time, departure time, total time), and charging preferences (e.g., preferences for certain electricity rates), to name a few. Consider the example where a user normally expects to charge their plug-in electric vehicle 10 at home during non-business hours and to occasionally charge the vehicle at work during business hours. It is possible for the user to provide a first set of charging settings for the home charging location that seeks to extend battery life by slowly charging the battery and to minimize electricity costs by waiting for off-peak times (i.e., slow charge mode and low rate preference), and a second set of charging settings for the work charging location that seeks to charge the battery as quickly as possible with less regard to battery life and cost (i.e., fast charge mode and no rate preference). Again, other user-defined charging settings may be received and established during this step, such as ones that pertain to expected departure times and limits on the amount of charging amperage, voltage and/or the state-of-charge (SOC) of battery 30. It is possible for a charging profile to include charging settings that are user-defined as well as ones that are not (e.g., default or vehicle-defined settings); both types of charging settings may be received at step 104.

Step 108 then checks to see if the charging settings received in the previous step are acceptable. A number of different limits, thresholds, rules, etc. may be used to determine the acceptability of the inputted charging settings. For example, step 108 may employ certain quantitative thresholds for amperage, voltage and/or state-of-charge (SOC) settings to ensure that battery 30 is not overcharged, or it may use logical rules to prohibit certain combinations of charging settings (e.g., an off-peak or low rate preference may be incompatible with certain charging start times, etc.). The precise combination of limits, thresholds and/or rules used by this step may vary, as it is not limited to any one embodiment. If step 108 determines that the charging settings are not acceptable, then the method loops back to step 104 so that new settings may be entered; if step 108 determines that the charging settings are, in fact, acceptable then the method proceeds to the next step.

As mentioned above, each charging profile is associated with a certain profile area; that is, a certain geographic area where the corresponding charging settings will be applied if plug-in electric vehicle 10 is charged in that area. The exact size, boundary and/or nature of the profile area may vary, and step 112 provides the user with the ability to select or create the profile area automatically or manually. Automatic creation of a profile area will largely be performed by one or more components of plug-in electric vehicle 10, while manual creation of a profile area will involve interaction with and input from the user. Step 112 may query the user via user interface 60 or some other appropriate device in order to determine if the user wishes to create the profile area automatically or manually. If the method does not receive an acceptable response to this inquiry, it may proceed with automatically creating a profile area.

If the user chooses to automatically create a profile area, then the method proceeds to step 116 so that the current location of the plug-in electric vehicle can be obtained. The current vehicle location can be used to automatically establish a profile area which is built around it, as will be explained. Step 116 may obtain the current vehicle location in a variety of ways, including gathering it from a GPS receiver in communications module 70. The precise form in which the vehicle location data is obtained (e.g., whether it be a longitude/latitude or other type of coordinate, a street address, etc.) is not crucial, as step 120 may process a variety of different types of data. In an exemplary embodiment, the user may select the automatic option for creating a profile area by engaging visual and/or audible features of user interface 60, in response to which the method automatically determines the present location of the vehicle (step 116) and then establishes the corresponding profile area around it (step 120).

Step 120 automatically creates or establishes a profile area around the current vehicle location, and may do so in a number of different ways. For instance, step 120 may construct a profile area around the current vehicle location by simply using a radius (e.g., 10 m, 1 km, 10 km, etc.) to define a circular boundary around that location. Profile areas that take other shapes, such as squares, rectangles, etc. may be used instead. In another exemplary embodiment, step 120 determines a profile area by selecting a known geographic area that encompasses the current vehicle location; this step could simply select the town, neighborhood, city, county, state, zip code, area code, electricity rate area, etc. in which the vehicle currently resides as the profile area. To illustrate, if plug-in electric vehicle 10 is presently located in a certain zip code when step 116 obtains its location, then step 120 may use that zip code and its boundaries as the profile area. Any number of techniques may be used to determine the profile area, as this step is not limited to the preceding examples.

If a user decides to manually create a profile area, then the method proceeds to step 124 so that the user may specify a desired location, a desired profile area, or some other piece of geographic input. The user may provide geographic input using any of the devices and/or techniques mentioned above, including those used in conjunction with step 104. According to one embodiment, the user manually specifies the desired location for the profile area (e.g., the center of the profile area) by entering coordinates, a street address and/or some other location indicating information (e.g., main crossroads or nearby intersection), but does not enter the actual profile area. Step 124 may then automatically build or establish a profile area around the manually-entered location (any of the techniques used in step 120 may be employed here) and present it to the user for approval. In another embodiment, the user manually enters the actual profile area that is to be used (e.g., they enter the town, neighborhood, city, county, state, zip code, area code, electricity rate area, etc. that acts as the boundaries of the profile area). Or, in yet another embodiment, the user enters both the preferred location and the area that is to serve as the profile area, as well as any other geographic input that may be useful.

At step 128, the method saves or stores the profile information gathered in the preceding steps in a charging profile. The charging profile may include the various charging settings selected by the user and the profile area that corresponds to those settings; together this information may constitute a location-based charging profile. As mentioned above, the charging profile may be stored in an electronic file, a database or some other suitable data structure, and can be saved in any number of different electronic memory devices located throughout plug-in electric vehicle 10. In one embodiment, the user provides the charging profile with a name (e.g., home charging profile, work charging profile, vacation home charging profile, etc.) and the named charging profile, along with all of its charging information, is stored in memory device 48. It is also possible to store all or some of the profile information externally in addition to or instead of at plug-in electric vehicle 10. For instance, the different charging profiles may stored at some remote vehicle service provider location (e.g., a call center, etc.) that communicates with the vehicle via communications module 70. Other embodiments and information storing arrangements are certainly possible as well.

Steps 104-128 may be repeated as many times as necessary in order to create all of the charging profiles wanted by the user. Skilled artisans will appreciate that similar steps may be used to edit, modify and/or otherwise change the information within an existing charging profile. Moreover, a charging profile may include both user-defined charging settings, such as those described above, as well as various default settings, parameters and/or other charging information. It is possible for a charging profile to include all of the charging information that is needed to conduct or carry out a charging process, or it may contain only a portion of such information so that the charging process must fill in the missing information from other sources. Other embodiments are also possible, as the charging system and method described herein are not limited to any specific charging profile configuration or setup.

Turning now to FIG. 3, there is shown an exemplary method 200 that may be used to provide customized, location-based charging services for plug-in electric vehicle 10. Depending on vehicle location, charging method 200 can apply a location-based charging profile that automatically configures user-defined charging settings for charging the plug-in electric vehicle. This may be accomplished automatically and without requiring the user to edit or modify the charging settings every time the vehicle is charged at a different location. Method 200 may be triggered or initiated by any number of suitable trigger events, such as when plug-in electric vehicle 10 enters a new profile area, when the vehicle is connected to an external power source 12, when the vehicle is turned 'on' and/or 'off', or when the user issues a command, to state a few possibilities.

Beginning at step 210, the method checks to see if the location-based charging feature is enabled. For example, this step could perform an inquiry to determine if this feature has been enabled by the user or is otherwise functional, it could check to see if any location-based charging profiles have been created and stored, or it could perform some other initial or startup process. If this location-based charging feature is enabled, then the method proceeds to step 214 for further processing; otherwise, the method turns to step 238 so that default charging settings or parameters can be established. The default charging settings may be established at manufacture or the point of sale, established previously by the user, or may simply be the last set of charging settings that were used to charge the plug-in electric vehicle, to cite several possibilities.

Step 214 obtains the current vehicle location so that the method can determine if a corresponding location-based charging profile already exists. As mentioned above in connection with step 116, any number of different techniques can be used to obtain the present vehicle location, including gathering the location from a GPS unit in communications module 70. However, other embodiments are also possible.

Next, step 218 determines if the current vehicle location corresponds to any of the stored charging profiles. In an exemplary embodiment, this step compares the current vehicle location to each of the profile areas that are stored in the different charging profiles in order to determine if the plug-in electric vehicle is currently within a certain profile area. If, for example, the current vehicle location is provided in terms of longitude and latitude coordinates and the different profile areas represent different zip codes, then step 218 may first convert the coordinates into a street address and then use map data to determine if the street address falls within any of the stored zip codes. This conversion and determination may be performed at the vehicle, at a back-end facility, or some combination of both. Other techniques for carrying out this step could certainly be used, as the vehicle location and the profile areas may be provided in a variety of different forms, as already discussed. Consider the example where plug-in electric vehicle 10 is currently at the user's work address, which corresponds to a profile area that is part of a work charging profile previously created by the user. In such a case the method proceeds to step 226. If plug-in electric vehicle 10 is at a charging kiosk at a highway rest stop, for example, or some other location for which there is no corresponding charging profile, then the method proceeds to step 222.

Step 222 establishes charging settings when the plug-in electric vehicle is at a location for which there is no corresponding charging profile. There are several different ways in which this step may establish new charging settings, including a manual method, a default method, and a community method; this step may give the user the option of selecting which of these methods they prefer. According to an exemplary embodiment of the 'manual method', step 222 utilizes user interface 60 or some other tool to manually gather charging settings, parameters and/or other preferences from the user, much the same way as in method 100. The charging information manually provided by the user can be used to create a new charging profile for this location. The 'default method', on the other hand, may retrieve default or the previously used charging settings, parameters and/or other preferences from an electronic memory device, such as those found in control module 40 or battery control unit 24, and use this charging information to establish charging settings and/or to create a new default charging profile. The 'community method' differs somewhat from the preceding examples in that it utilizes a collection or repository of shared charging settings from other plug-in electric vehicles in the area when establishing charging settings or making a new charging profile; thus, taking advantage of the knowledge or experience of local users that may be aware of certain area-or region-specific charging factors, like different electricity rates, common electricity disruptions, etc.

To illustrate the community method, consider the example where plug-in electric vehicle 10 is traveling and stops to charge at a service station or other location that it has never been to before. For obvious reasons, it is unlikely that the user would have previously created a charging profile for this location; thus, step 222 will have to create a new charging profile. Instead of using manually-entered or default settings that do not take area-or region-specific considerations into account, the community method attempts to tap into and utilize the collective charging knowledge of other plug-in electric vehicles in the area by gathering charging settings, parameters and/or other preferences from a community database of such information. One way to do this is for communications module 70 to send a wireless message to some back-end facility that maintains such a database and to gather the needed charging information for this particular location or the next closest one. Of course, the different methods described above in conjunction with step 22 represent only some of the possible ways in which the method may establish charging settings for locations where there is no corresponding charging profile; other embodiments and techniques may be used instead.

Step 226 establishes charging settings in situations where the current vehicle location corresponds to a stored profile area. In an exemplary embodiment where plug-in electric vehicle 10 is currently located at the user's home (for which there is already a stored charging profile), step 226 simply looks up the charging settings and/or other information contained in the home charging profile and automatically establishes or loads those settings so that they can be used to subsequently charge the vehicle. Skilled artisans will appreciate that steps 222, 226 and/or 238 may use any suitable method or technique for "establishing" charging settings, including ones that load the charging settings in memory temporarily so that they can govern or control the next charging process. The following charging cycle could see a different set of charging settings loaded, depending on the location of the plug-in electric vehicle at that time, for example.

Steps 230 and 234 are optional and provide the user with a manual override feature in the event that they wish to modify any of the charging settings or other preferences that have been established before the charging process begins. In the exemplary method shown in FIG. 3, this manual override feature may be implemented via user interface 60 (if the user is actually in the vehicle) and/or communications module 70 (if the user is making charging setting modifications via a mobile device, computer, etc.). If the user decides to manually override one or more charging settings, then the method proceeds to step 234 where the user is presented with one or more visual and/or audible menus that enable modification and storing of user-defined charging settings. Again, any combination of user interface 60, communications module 70 and/or other tools may be used for this purpose. If the user does not wish to make charging setting modifications and is satisfied with the charging settings that have already been established, then the method proceeds to steps 242 so that the charging process can commence.

Step 242 applies the previously established charging settings (whether they were established at step 222, 226, 238 or elsewhere) and begins the vehicle charging process accordingly. In one potential embodiment, step 242 causes control module 40 to generate and send one or more charging signals to battery charger 24, which in turn causes the battery charger to automatically charge battery 30 according to the previously established charging settings. Skilled artisans will appreciate that any number of different techniques, methods, processes, etc. could be used to generate charging signals or command signals from established charging settings, and that the current method is not limited to any particular embodiment.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. It is also possible for the exemplary charging method to track whether or not the plug-in electric vehicle has moved from its previous charging location and, in the event that it has moved, apply a location-based charging profile accordingly. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for charging a plug-in electric vehicle, comprising the steps of:
   (a) creating and storing one or more user-defined charging profile(s), each charging profile being associated with a stored profile area, and wherein each charging profile includes customized charging setting(s) that are defined by a user when creating the charging profile for each stored profile area, wherein the customized charging setting(s) defined by the user include at least one selected from the group consisting of: a charging mode, a charging level, a charging time, or a charging preference;
   (b) obtaining a current location for the plug-in electric vehicle;
   (c) determining if the current location for the plug-in electric vehicle corresponds to a stored profile area by comparing the current location to one or more stored profile area(s) in order to determine if the current vehicle location falls within geographic boundaries of the stored profile area(s);
   (d) when the current location for the plug-in electric vehicle corresponds to a stored profile area, then using a control module to implement the associated charging profile for the stored profile area and a battery charger to charge the plug-in electric vehicle; and
   (e) when the current location for the plug-in electric vehicle does not correspond to a stored profile area, then using the control module to create and implement a new charging profile for the current location according to a community method that utilizes a collection or repository of shared charging information from other plug-in electric vehicles to provide one or more charging setting(s) and the battery charger to charge the plug-in electric vehicle.

2. The method of claim 1, wherein step (a) further comprises locally receiving one or more user-defined charging setting(s) via a user interface in the plug-in electric vehicle, and then storing a charging profile that includes the user-defined charging setting(s).

3. The method of claim 1, wherein step (a) further comprises remotely receiving one or more user-defined charging setting(s) via a communications module in the plug-in electric vehicle, and then storing a charging profile that includes the user-defined charging setting(s).

4. The method of claim 1, wherein step (a) further comprises obtaining a current location for the plug-in electric vehicle and automatically establishing a profile area using the current location, and then storing a charging profile that is associated with the profile area.

5. The method of claim 1, wherein step (a) further comprises receiving from a user geographic input that includes a location and boundaries for a profile area and manually establishing the profile area using the geographic input, and then storing a charging profile that is associated with the profile area.

6. The method of claim 1, wherein step (b) further comprises obtaining a current location for the plug-in electric vehicle from a GPS unit located on the vehicle.

7. The method of claim 1, wherein step (c) further comprises converting the current vehicle location from one form to another, and then comparing the converted vehicle location to one or more stored profile area(s).

8. The method of claim 1, wherein step (e) further comprises establishing a new charging profile according to a manual method that utilizes a user interface in the plug-in electric vehicle to provide one or more charging setting(s) from the user.

9. The method of claim 1, wherein step (e) further comprises establishing a new charging profile according to a default method that utilizes an electronic memory device in the plug-in electric vehicle to provide one or more default or previously used charging setting(s).

10. The method of claim 1, wherein step (e) further comprises exchanging wireless information between a communications module on the plug-in electric vehicle and a back-end facility that maintains a database that stores the collection or repository of shared charging information.

11. The method of claim 1, wherein step (d) further comprises using the associated charging profile to automatically establish one or more user-defined charging setting(s) without requiring any subsequent intervention on the part of the user.

12. The method of claim 11, wherein step (d) further comprises applying the user-defined charging setting(s) to a process for charging the plug-in electric vehicle.

13. A method for charging a plug-in electric vehicle, comprising the steps of:
(a) creating and maintaining a plurality of charging profiles, each charging profile includes a set of charging settings and is associated with a certain profile area;
(b) obtaining a current location for the plug-in electric vehicle;
(c) comparing the current location for the plug-in electric vehicle to the plurality of stored profile areas;
(d) establishing a set of charging settings for charging the plug-in electric vehicle based on the comparison between the current location of the plug-in electric vehicle and the stored profile areas, and when the plug-in electric vehicle is at a location for which there is no stored profile area, using a community method that utilizes a collection or repository of shared charging information from other plug-in electric vehicles to establish new charging settings for charging the plug-in electric vehicle based on the shared charging information; and
(e) using a battery charger to charge the plug-in electric vehicle according to the established charging settings.

14. A system for charging a plug-in electric vehicle, comprising:
a power connection for connecting to an external power source;
a battery charger coupled to the power connection;
a battery coupled to the battery charger;
a global positioning system (GPS) unit for determining the current position of the plug-in electric vehicle; and
a control module electronically coupled to the GPS unit for receiving vehicle location signals and electronically coupled to the battery charger for providing charging command signals, wherein the control module is configured to create and store a plurality of user-defined charging profiles where each charging profile includes customized charging setting(s) that are defined by a user when creating the charging profile, wherein the customized charging setting(s) defined by the user include at least one selected from the group consisting of: a charging mode, a charging level, a charging time, or a charging preference and wherein each charging profile is associated with a certain profile area, the control module is further configured to automatically establish the charging command signals with one or more user-defined charging setting(s) from one of the plurality of stored charging profiles when a comparison of the current position of the plug-in electric vehicle to geographic boundaries reveals that the current position of the plug-in electric vehicle is within a corresponding profile area, and to establish one or more charging setting(s) from a new charging profile when the current position of the plug-in electric vehicle is not within geographic boundaries of any of the corresponding profile areas, wherein the new charging profile is established according to a community method that utilizes a collection or repository of shared charging information from other plug-in electric vehicles to provide one or more charging setting(s).

\* \* \* \* \*